US012775801B2

(12) United States Patent
Dongare et al.

(10) Patent No.: US 12,775,801 B2
(45) Date of Patent: Oct. 27, 2026

(54) COMPUTER-IMPLEMENTED METHODS, SYSTEMS COMPRISING COMPUTER-READABLE MEDIA, AND ELECTRONIC DEVICES FOR BANK OPERATIONS TRANSACTION ANALYSIS

(71) Applicant: Mastercard International Incorporated, Purchase, NY (US)

(72) Inventors: Siddhesh Dongare, Kalyan (IN); Nick Baguley, Salt Lake City, UT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 160 days.

(21) Appl. No.: 18/933,534

(22) Filed: Oct. 31, 2024

(65) Prior Publication Data

US 2026/0119794 A1 Apr. 30, 2026

(51) Int. Cl.
*G06F 40/284* (2020.01)
*G06F 16/353* (2025.01)

(52) U.S. Cl.
CPC .......... *G06F 40/284* (2020.01); *G06F 16/353* (2019.01)

(58) Field of Classification Search
USPC ...................................................... 704/1–504
See application file for complete search history.

(56) References Cited

U.S. PATENT DOCUMENTS 6,915,254 B1 * 7/2005 Heinze ................ G06F 16/3344
707/E17.058
11,080,336 B2 * 8/2021 Van Dusen ....... G06F 16/90335
2017/0091320 A1 * 3/2017 Psota .................... G06F 16/313
2021/0200759 A1 * 7/2021 Lyons .................... G06N 20/00
2026/0119794 A1 * 4/2026 Dongare ............... G06F 40/284

FOREIGN PATENT DOCUMENTS

CN 115983257 4/2023
CN 115983257 A * 4/2023
CN 118779382 10/2024
CN 118779382 A * 10/2024 ........... G06F 21/602
CN 115983257 B * 8/2025
KR 101495701 2/2015
KR 101495701 B1 * 2/2015 ............. E04G 5/141
WO WO-2026096121 A1 * 5/2026 ........... G06F 16/353

OTHER PUBLICATIONS

International Search Report and Written Opinion issued Jan. 26, 2026 in related International Application No. PCT/US2025/047888.

* cited by examiner

*Primary Examiner* — Marcus T Riley
(74) *Attorney, Agent, or Firm* — Pillsbury Winthrop Shaw Pittman LLP

(57) ABSTRACT

A computing system is configured to receive raw transaction data from a database. The computing system performs natural language processing operation on the raw transaction data. The computing system identifies one or more keywords within one or more of description and memo data fields for each transaction data piece. The computing system matches the one or more keywords to one or more operational phrases included in an operational phrases lookup table. The computing system creates labeled transaction data by associating one or more labels with each transaction data piece. The one or more labels correspond to the matched one or more operational phrases based on the matching.

20 Claims, 5 Drawing Sheets

COMPUTER-IMPLEMENTED METHODS, SYSTEMS COMPRISING COMPUTER-READABLE MEDIA, AND ELECTRONIC DEVICES FOR BANK OPERATIONS TRANSACTION ANALYSIS

FIELD OF THE DISCLOSURE

The field of the disclosure relates to bank operations transaction analysis and, more particularly, to techniques to determine categorization fields for bank operations transactions.

BACKGROUND

Bank operations transactions focus on internal activities and processes within the bank or with an external bank, such as customer service requests, account maintenance, or infrastructure management. Bank operations transactions do not typically require merchant identification or transaction categorization. On the other hand, general transactions involve external parties like customers, merchants, and recipients, where merchant identification and transaction categorization are relevant for proper processing and record-keeping.

The current transaction categorization and data enrichment solutions lack a comprehensive understanding of the relationship between transaction types and bank operations. While transaction types are a subset of bank operations and offer a more granular categorization of financial activities, they are not effectively integrated within the broader framework of bank operations. This disconnect hinders the accuracy and efficiency of transaction categorization and data enrichment processes. As a result, the transaction categorization and data enrichment solutions fail to capture the full range of transaction types within the context of overall bank operations, resulting in inadequate categorization and limited insights into financial transaction patterns. This may lead to inaccurate transactional data, financial institution operation inefficiencies, decreased fraud detection and/or compliance, and incorrect transaction data categorization.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a computing system is provided. The computing system includes a database, one or more processors, and a memory. The database includes an operational phrases lookup table including one or more records. Each record includes an operational phrase and an associated description, definition, and/or related details. The database also includes raw transaction data. The raw transaction data includes individual transaction data pieces. Each of the transaction data pieces includes multiple data fields. The multiple data fields include a description data field and a memo data field. Each data field includes text. The memory includes computer-executable instructions thereon, that when executed by the one or more processors, cause the one or more processors to perform operations including receiving the raw transaction data from the database. The one or more processors perform a natural language processing operation on the raw transaction data, including identifying one or more keywords within one or more of the description and memo data fields for each transaction data piece. Furthermore, the processors match the one or more keywords to one or more operational phrases included in the operational phrases lookup table. Moreover, the processors create labeled transaction data by associating one or more labels with each transaction data piece. The one or more labels correspond to the matched one or more operational phrases based on the matching.

In another aspect, a computer-implemented method is provided. The method is performed by a server. The method includes receiving raw transaction data from a database. The database includes the raw transaction data and an operational phrases lookup table. The operational phrase lookup table includes one or more records. Each record includes an operational phrase and an associated description, definition, and/or related details. The raw transaction data includes individual transaction data pieces. Each of the transaction data pieces includes multiple data fields. The multiple data fields include a description data field and a memo data field. Each data field includes text. The method includes performing a natural language processing operation on the raw transaction data, including identifying one or more keywords within one or more of the description and memo data fields for each transaction data piece. The method also includes matching the one or more keywords to one or more operational phrases included in the operational phrases lookup table. Furthermore, the method includes creating labeled transaction data by associating one or more labels with each transaction data piece. The one or more labels correspond to the matched one or more operational phrases based on the matching.

In yet another aspect, a non-transitory computer-readable storage media is provided. The non-transitory computer-readable storage media has computer-executable instructions stored thereon, wherein when executed by one or more processors, the computer-executable instructions cause the one or more processors to receive raw transaction data from a database. The database includes the raw transaction data and an operational phrases lookup table. The operational phrase lookup table includes one or more records. Each record includes an operational phrase and an associated description, definition, and/or related details. The raw transaction data includes individual transaction data pieces. Each of the transaction data pieces includes multiple data fields. The multiple data fields include a description data field and a memo data field. Each data field includes text. The computer-executable instructions also cause the one or more processors to perform a natural language processing operation on the raw transaction data, including identifying one or more keywords within one or more of the description and memo data fields for each transaction data piece. Furthermore, the computer-executable instructions cause the one or more processors to match the one or more keywords to one or more operational phrases included in the operational phrases lookup table. Moreover, the computer-executable instructions cause the one or more processors to create labeled transaction data by associating one or more labels with each transaction data piece. The one or more labels correspond to the matched one or more operational phrases based on the matching.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

Exemplary System

Figure 1:
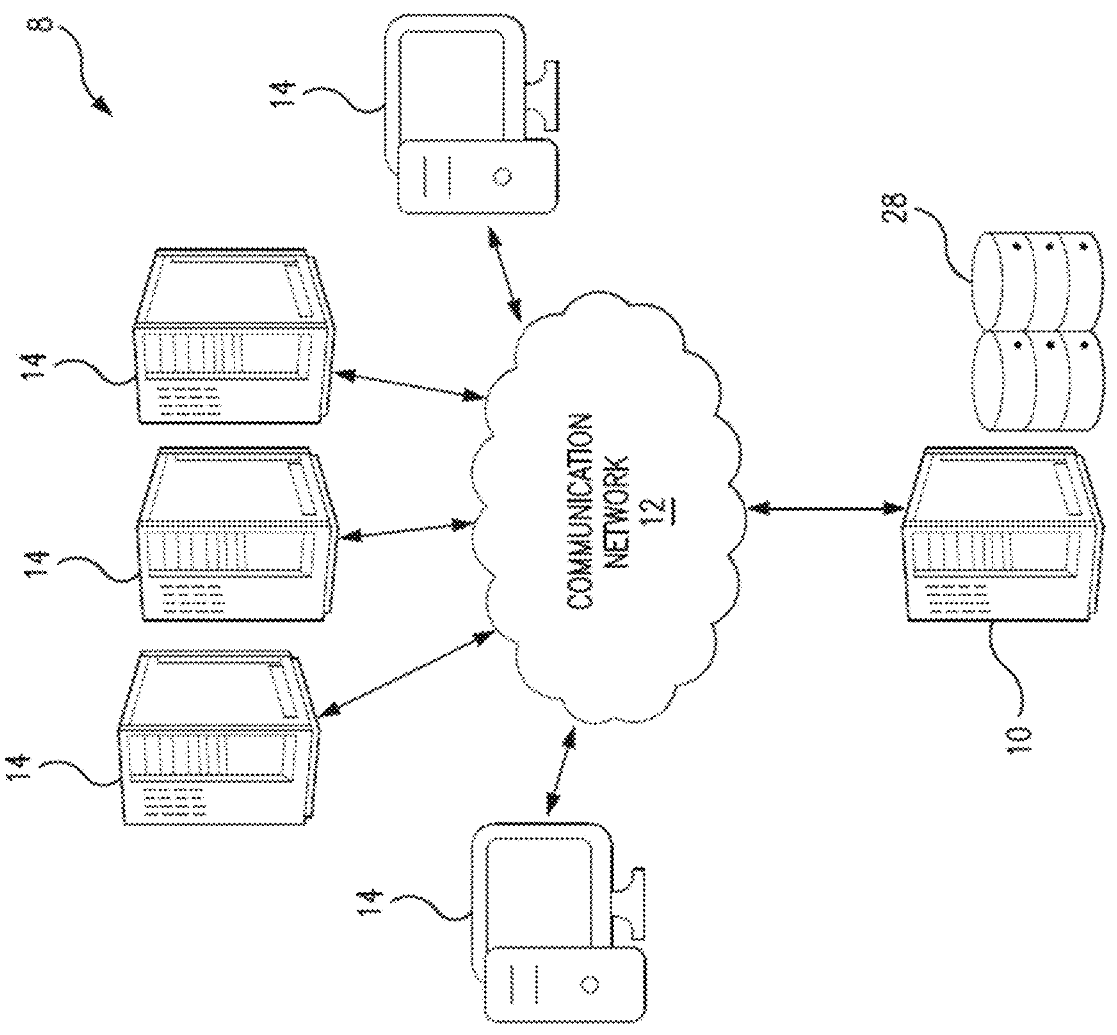
FIG. 1 depicts an exemplary system in which a server may be utilized for bank operation phrase identification and categorization/enrichment in an open banking environment.

FIG. 1 depicts an exemplary system 8 in which embodiments of a server 10 may be utilized for bank operation phrase identification and categorization/enrichment, for example, on large batches of data (e.g., raw transaction data and the like), in an open banking environment. The system 8 may include a communication network 12 coupled to a plurality of data source computing devices 14. Each data source computing device 14 may include a desktop computer, a laptop or tablet computer, an application server, a database server, a file server, or the like, or combinations thereof, configured to periodically or continuously provide data (such as raw transaction data) and/or data updates to the server 10 to store, for example, in a database 28. The server 10 may include and/or work in conjunction with application servers, database servers, file servers, gaming servers, mail servers, print servers, or the like, or combinations thereof. Furthermore, the server 10 may include a plurality of servers, virtual servers, or combinations thereof.

The communication network 12 may provide wired and/or wireless communication between the data source computing devices 14 and the server 10. Each of data source computing devices 14 and the server 10 may be configured to send data to and/or receive data from the communication network 12 using one or more suitable communication protocols, which may be the same communication protocols or different communication protocols as one another.

The communication network 12 may generally allow communication between the data source computing devices 14 and the server 10. For example, the data source computing devices 14 may, upon request, periodically and/or continuously push or otherwise provide new or updated data to the server 10 over the communication network 12.

The communication network 12 may include one or more telecommunication networks, nodes, and/or links used to facilitate data exchanges between one or more devices and may facilitate a connection to the Internet for devices configured to communicate with the communication network 12. The communication network 12 may include local area networks, metro area networks, wide area networks, cloud networks, the Internet, cellular networks, plain old telephone service (POTS) networks, and the like, or combinations thereof.

The communication network 12 may be wired, wireless, or combinations thereof and may include components such as modems, gateways, switches, routers, hubs, access points, repeaters, towers, and the like. The data source computing devices 14 and the server 10 may connect to the communication network 12 either through wires, such as electrical cables or fiber optic cables, or wirelessly, such as radio frequency (RF) communication using wireless standards such as cellular 3G, 4G, 5G, and the like, Institute of Electrical and Electronics Engineers (IEEE) 802.11 standards such as Wi-Fi, IEEE 802.16 standards such as WiMAX, Bluetooth™, or combinations thereof. In aspects in which the network 12 facilitates a connection to the Internet, data communications may take place over the network 12 via one or more suitable Internet communication protocols. For example, the network 12 may be implemented as a wireless telephony network (e.g., GSM, CDMA, LTE, etc.), a Wi-Fi network (e.g., via one or more IEEE 802.11 Standards), a WiMAX network, a Bluetooth network, etc.

Figure 2:
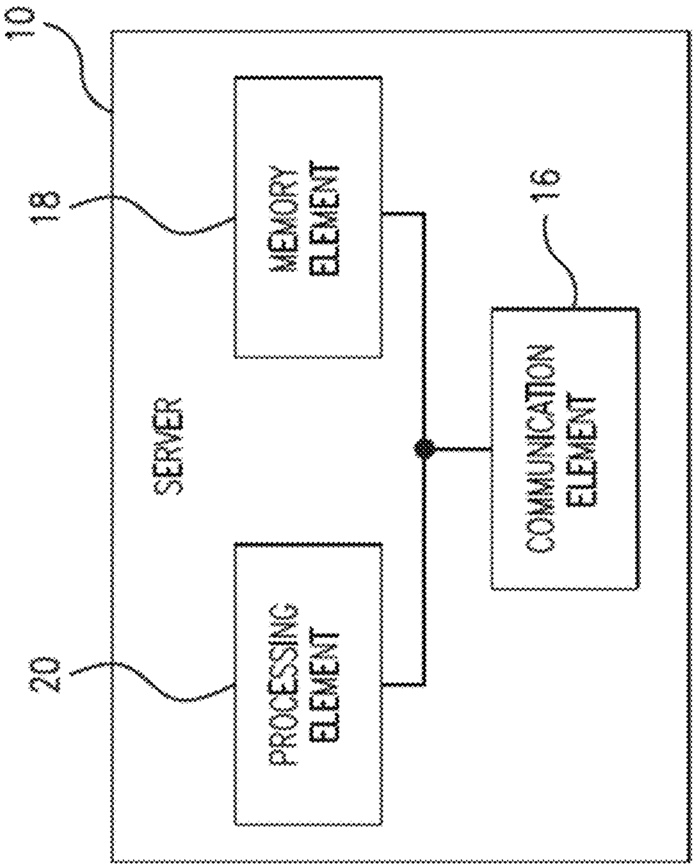
FIG. 2 is an example configuration of a server for use in the system shown in FIG. 1.
Figure 3:
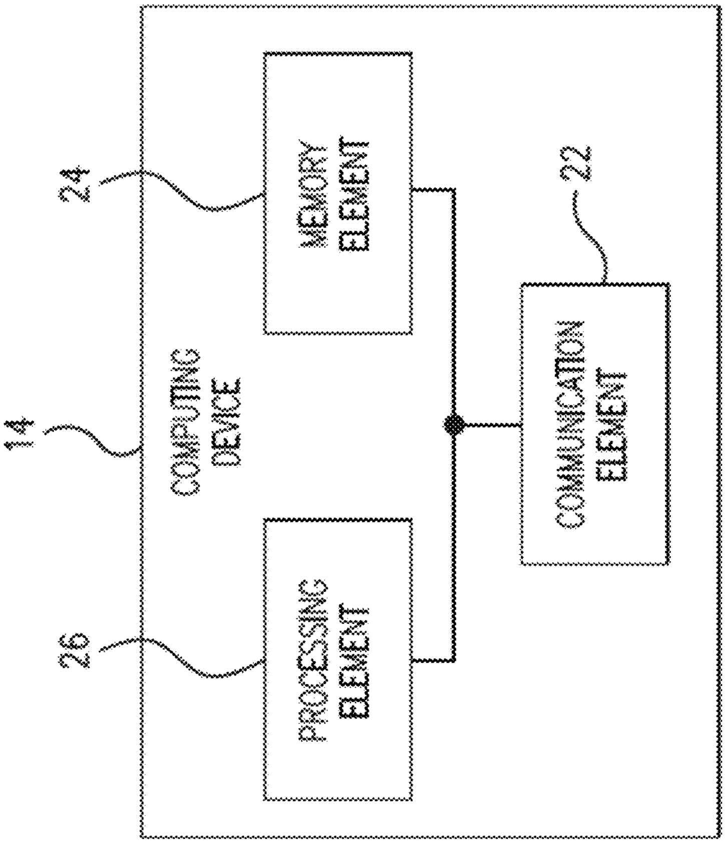
FIG. 3 is an example configuration of a data source computing device for use in the system shown in FIG. 1.

The server 10 may generally retain electronic data and may respond to requests to retrieve data, as well as to store data. The server 10 may be configured to include or execute software, such as file storage applications, database applications, email or messaging applications, web server applications, and/or artificial intelligence (AI) or machine learning (ML) software/models or the like. As indicated in FIG. 2, the server 10 may broadly include a communication element 16, a memory element 18, and a processing element 20. Likewise, as indicated in FIG. 3, each of the data source computing devices 14 may broadly include a communication element 22, a memory element 24, and a processing element 26.

The communication elements 16, 22 may each generally allow communication with external systems or devices, including the communication network 12, via wireless communication and/or data transmission over one or more direct or indirect radio links between devices. The communication elements 16, 22 each may include signal or data transmitting and receiving circuits, such as antennas, amplifiers, filters, mixers, oscillators, digital signal processors (DSPs), and the like. The communication elements 16, 22 each may establish communication wirelessly by utilizing RF signals and/or data that comply with communication standards such as cellular 2G, 3G, or 4G, Wi-Fi, WiMAX, Bluetooth™, and the like, or combinations thereof. In addition, the communication elements 16, 22 each may utilize communication standards such as ANT, ANT+, Bluetooth™ low energy (BLE), the industrial, scientific, and medical (ISM) band at 2.4 gigahertz (GHz), or the like.

Alternatively, or in addition, the communication elements 16, 22 each may establish communication through physical connectors or couplers that receive metal conductor wires or cables that are compatible with networking technologies, such as ethernet. In certain embodiments, the communication elements 16, 22 each may also couple with optical fiber cables. The communication elements 16, 22 each may be in communication with corresponding ones of the processing elements 20, 26 and the memory elements 18, 24, via, e.g., wired or wireless communication.

The memory elements 18, 24 each may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory elements 18, 24 each may be embedded in, or packaged in the same package as, the corresponding one of the processing elements 20, 26. The memory elements 18, 24 each may include, or may constitute, a "computer-readable medium." The memory elements 18, 24 each may store computer-executable instructions, code, code segments, software, firmware, programs, applications, apps, modules, agents, services, daemons, or the like that are executed by the processing elements 20, 26, including—in the case of processing element 20 and the memory element 18—the AI or ML software/models or the like. The memory elements 18, 24 each may also store settings, data, documents, sound files, photographs, movies, images, databases, and the like, including the items described throughout this disclosure.

The processing elements 20, 26 each may include electronic hardware components such as processors. The processing elements 20, 26 each may include digital processing unit(s). The processing elements 20, 26 each may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing elements 20, 26 each may generally execute, process, or run computer-executable instructions, code, code segments, software, firmware, programs, applications, apps, modules, agents, processes, services, daemons, or the like, including—in the case of processing element 20—one or more AI or ML software/models and/or data analysis processes described throughout this disclosure. The processing elements 20, 26 each may also include hardware components such as finite-state machines, sequential and combinational logic, and other electronic circuits that can perform the functions necessary for the operation of the current disclosure. The processing elements 20, 26 each may be in communication with the other electronic components through serial or parallel links that include address busses, data busses, control lines, and the like.

Through hardware, software, firmware, or combinations thereof, the processing elements 20, 26 each may be configured or programmed to perform the functions described herein below.

Figure 4:
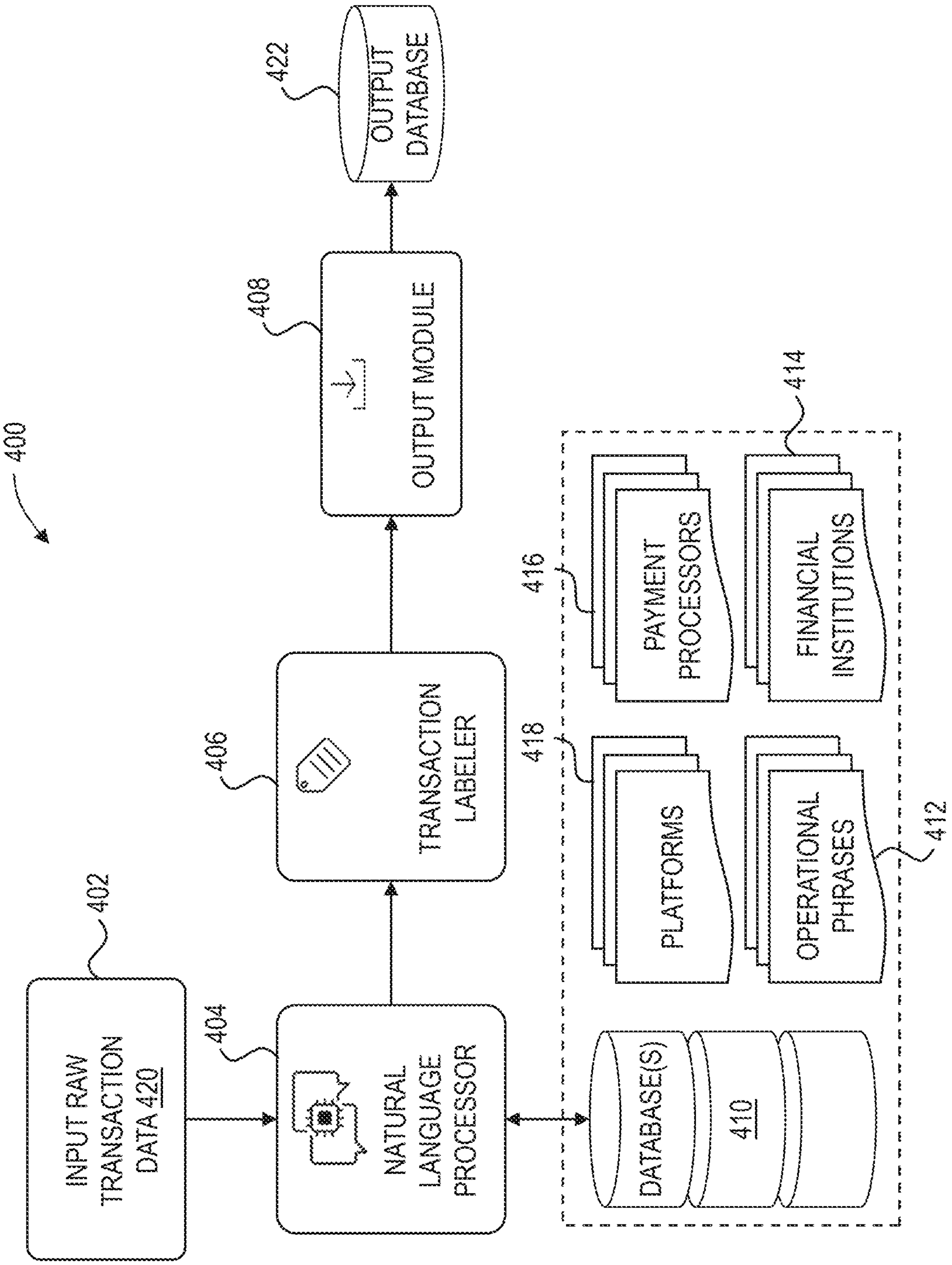
FIG. 4 is an exemplary framework for use with the server of FIG. 1, the depicted framework including logical components and data exchanges and flows for identifying banking operational phrases and other key elements in open banking transaction data.

FIG. 4 is an exemplary framework 400 illustrating logical components and data exchanges and flows for identifying banking operational phrases and other key elements in open banking transaction data, in accordance with embodiments of the present disclosure. The framework 400 components may include a natural language processor (NLP) 404, a transaction labeler 406, and one or more databases 410. The database(s) 410 may be, or may be included with, the database 28 (shown in FIG. 1). The framework may be part of the server 10 (shown in FIG. 1) and the operations described below may be performed by the server 10. Also, the operations may be implemented as instructions, code, code segments, code statements, a program, an application, an app, a process, a service, a daemon, or the like, and may be stored on a computer-readable storage medium, such as the memory element 18 (shown in FIG. 1).

The database(s) 410 may include, for example, a plurality of lookup tables, such as an operational phrases lookup table 412, a financial institutions lookup table 414, a payment processor lookup table 416, a platforms lookup table 418, and any other lookup table that enables the framework 400 to function as described herein. The plurality of lookup tables may store various token mappings, unique identifiers, strings, and substrings for identification of certain data and/or entities involved in financial transactions. The plurality of lookup tables may provide such data to the NLP 404.

In the example, the operational phrase lookup table 412 may include a plurality of entries or records, each including an operational phrase and the operational phrase's associated description, definition, and/or related details (i.e., token mapping data). It is noted that the operational phrase lookup table 412 may include any number of entries or records. Table 1 below depicts example entities that may be included in the operational phrase lookup table 412.

TABLE 1

| BANK OPERATION PHRASE | DESCRIPTION |
|---|---|
| ACCOUNT BALANCE INQUIRY | The process of checking the current balance in a bank account. It may be done through various channels such as ATMs, online banking, mobile apps, or by contacting a bank's customer service. |

TABLE 1-continued

| BANK OPERATION PHRASE | DESCRIPTION |
|---|---|
| ACCOUNT FEE | An account fee is a charge imposed by the bank for maintaining the account. It may be a fixed monthly fee or an annual fee, or the fee may be charged based on specific transactions or services utilized. The amount and type of account fees vary across different banks and account types. |
| ATM FEE/ATM FEE DEBIT | A fee charged by a bank for using their ATM to withdraw cash or perform other transactions. It is deducted directly from the account associated with the ATM transaction. |

The financial institutions lookup table 414 may include a plurality of entries or records, each corresponding to confirmed, standardized financial institutions and their associated strings, substrings, unique identifiers, combinations of any of the foregoing, and the like. For example, in one or more embodiments, the financial institutions lookup table 414 may include records for each uniquely identified (e.g., standardized) financial institution and may define strings and substrings which, if found alone and/or in specified combination(s) and/or contexts in financial transaction data, positively identify, authenticate, and match to the standardized financial institution. For example, the financial institutions lookup table 416 may store a string combination of "Citi Bank," and define such a string combination as a standardized name of "City Bank."

The payment processor lookup table 414 may include a plurality of entries or records, each including a payment processor and their associated strings, substrings, unique identifiers, combinations of any of the foregoing, and the like. Similarly, the platforms lookup table 418 includes a plurality of entries or records, each including a platform or transaction platform and their associated strings, substrings, unique identifiers, combinations of any of the foregoing, and the like.

Raw transaction data 420 (e.g., financial transaction data) may be input to the NLP 404. For example, in one embodiment, the server 10 may retrieve the raw transaction data 420 from the database 28. Alternatively, or in addition, the server 10 may receive raw transaction data 420 from one or more of the data source computing devices 14 (shown in FIG. 1). In an embodiment, the raw transaction data 420 includes a plurality of individual pieces of transaction data, wherein each individual piece corresponds to a respective transaction. Each respective piece of transaction data includes a plurality of data fields, including, for example, a description data field and a memo data field. In some embodiments, one or more of the description and memo data fields may include text data. It is contemplated, however, that the data fields may include any type of data or data structure that enables the framework 400 to function as described herein.

The NLP 404 may perform natural language processing on the raw transaction data 420 (e.g., financial transaction data). In an example, the NLP 404 may perform the natural language processing by scanning the text contained in the description and memo data fields. The NLP 404 may identify one or more keywords within one or more of the description and memo data fields for each transaction record and generate one or more word tokens and n-grams, as described further herein.

The NLP 404 may intermittently, continuously, and/or periodically receive the token mappings from the various lookup tables, such as lookup tables 412, 414, 416, and 418, contained in the database 410 and match the token mappings provided by the lookup tables to one or more of the n-grams parsed from or identified in the raw transaction data 420 for the financial transaction.

The transaction labeler 406 may associate one or more labels with each respective transaction record if one or more of the word tokens are found to match one or more of the token mappings. One of ordinary skill will appreciate that a variety of known keyword based labeling algorithms may be used in accordance with embodiments of the present disclosure. In one or more embodiments, one or more rules may associate one of a plurality of labels with one or more portions of the respective transaction record according to one or more word tokens or n-grams extracted from the record. Each rule may look for one or more of the tokens or n-grams in the token mappings and then may associate a label with the record, if found. For example, a first rule may search the lookup tables 412, 414, 416, and 418 record for a first keyword (e.g., in token form) and associate a first label with the transaction record if the first keyword (or a sufficiently similar variation thereof) is found. A second rule may search the lookup tables for a second keyword (or a sufficiently similar variation thereof) and associate a second label with the record if the second keyword is found, and so forth with successive rules, keywords, and labels. It is noted that the labels described herein correspond to the operational phrases, financial institutions, payment processors, platforms, etc.

The transaction labeler 406 may output the labeled transaction data, labeled with any identified operational phrases, financial institutions, payment processors, platforms, etc. to an output module 408. The output module 408 may generate output data including each transaction record being associated with the identified operational phrases and associated descriptions or definitions, financial institutions and their standardized names, payment processors, platforms, etc. The output module 408 may also store the output data, for example, in an output database 422. It is noted that the output database 422 may include the database(s) 410 and/or the database 28 (shown in FIG. 1).

Figure 5:
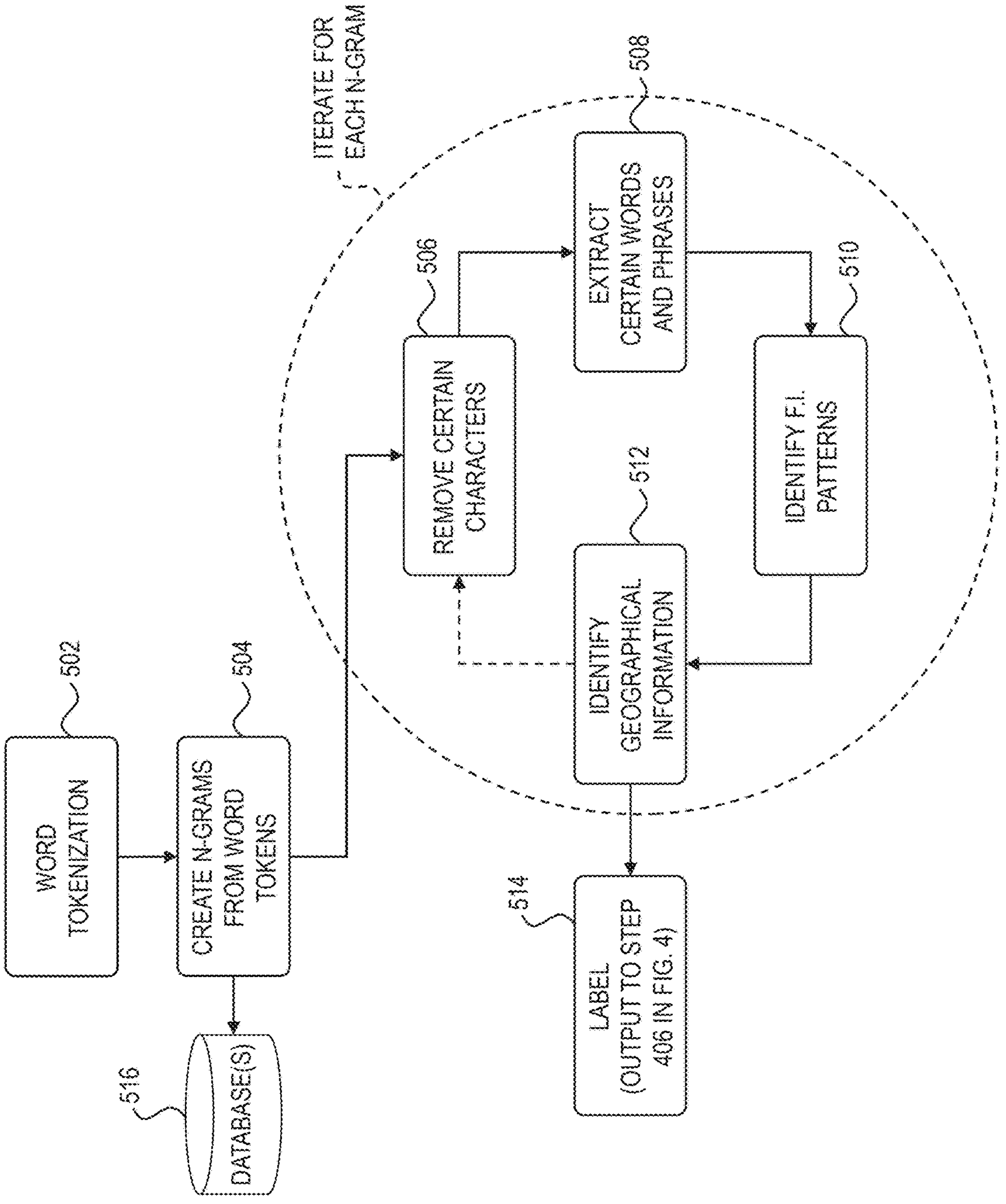
FIG. 5 is a flowchart illustrating a process for parsing and extracting certain words and phrases, such as operational phrases, from transaction details, using the framework of FIG. 4.

FIG. 5 is a flowchart illustrating a process for parsing and extracting certain words and phrases, such as operational phrases, from transaction details (i.e., the description and memo data fields), in accordance with an embodiment of the present disclosure. The process depicted in FIG. 4 may be performed by the NLP 404 (shown in FIG. 4).

At 502, the NLP 404 may perform word tokenization on each transaction record of the raw transaction data 420 input to the NLP 404. As noted above, at 402 of FIG. 4, the NLP 402 may receive raw transaction data 420 for processing. Further, as described herein, the raw transaction data 420 include financial transaction data. Thus, the NLP process performed by the NLP 404 is performed for each transaction record included in the dataset.

Referring to FIG. 5, in a non-limiting example, the word tokenization process may be performed using Natural Language Toolkit (NLTK). NLTK is a Python-based Natural Language Processing (NLP) open-source library. NLTK provides extendible implementations for basic NLP processing which may include sentence segmentation, word tokenization, word lemmatization, part-of-speech (POS) tagging, shallow parsing ("chunking"), and text classification. Word tokens may be generated using various tokenizing techniques available in NLTK. For example, the text may be read via a whitespace tokenizer that splits the text into a sequence of whitespace delimited tokens. The sequence may be filtered, for example, by removing all words less a selected threshold, such as five (5) characters long and by removing stop words (e.g., 'the', 'is', 'are', etc.). In another example, the text may be read via a punctuation tokenizer that splits the text into a sequence of alphabetic and non-alphabetic characters. In yet another example, the text may be read via a treebank word tokenizer that splits the text into a sequence of words. For example, a treebank tokenizer splits standard contractions, treats most punctuation characters as separate tokens, splits off commas and single quotes (when followed by whitespace), and separates periods that appear at the end of line.

The phrase "word tokenization," as used herein includes a process of splitting large sentences or transactions of text into individual words, including defining a token for each word. The phrase "text lemmatization" and like terms, as used herein, include doing things properly with the use of a vocabulary and structural analysis of words, aiming to remove inflectional endings only and to return the base or dictionary form of a word, which is known as the lemma. As described above, stop words are available in large quantity in the transaction data. By removing these stop words, the low-level information is removed from the transaction data to enable focus/attention to the important information. Similarly, punctuations are removed from the text because the punctuations affect the results of the analysis, especially what depends on the occurrence frequency of words and phrases.

At 504, the NLP 404 may create one or more n-grams from the word tokens and store them in a database 516 for further processing and use. The word tokens derived from each transaction record of the raw transaction data 420 may be compared against a plurality of rules. In one or more embodiments, the rules of the NLP process or program may be written in JavaScript object notation (json). The plurality of rules may define respective string matching or token matching criteria or conditions. Each of the plurality of rules may include parsing and analysis techniques such as n-gram analysis, regular expression (regex) analysis, fuzzy matching, lookup tables and the like.

N-gram analysis typically involves sequentially grouping the text of the transaction record into n-word clusters, where n is an integer value. As an example, if n=2, then the first word and the second word would be grouped, the third word and the fourth word would be grouped, and so forth. Using the example transaction data above, i.e., "ATM transfer fee charged by Citi Bank," the NLP 404 may create n-grams with n being the following: i) the integer 1, an unigram (single word); ii) the integer 2, a bigram (pair of words); and iii) the integer 3, a trigram (triplet of words), as described below.

| | |
|---|---|
| Unigrams: | ["ATM", "transfer", "fee", "charged", "by", "Citi", "Bank"] |
| Bigrams: | ["ATM transfer", "transfer fee", "fee charged", "charged by", "by Citi", "Citi Bank"] |

-continued

| | |
|---|---|
| Trigrams: | ["ATM transfer fee", "transfer fee charged", "fee charged by", "charged by Citi", "by Citi Bank"] |

Regex analysis typically involves searching the text of the record for a string of characters, wherein the characters may vary. This technique typically involves a set of rules or conditions represented by "regular expression" (regex) patterns. A "regular expression" is a pattern (or filter) that describes a set of strings that matches the pattern. In other words, a regex accepts a certain set of strings and rejects the rest. Fuzzy matching typically involves searching for variations of a particular term, wherein the variations may include different spellings of a word, the inclusion of spaces or dashes, and the like.

The following described steps, 506, 568, 510, and 512 are performed for each identified n-gram. That is, the NLP 404 iterates the steps, 506, 568, 510, and 512 for each n-gram during the NLP processing.

At 506, the NLP 404 may remove certain special characters; trailing special characters if the special characters occur more than once; any trailing digits; any accent words; and any masked numbers (e.g., partially masked account numbers or masked credit card numbers). An example process may include the following: i) example n-grams include [ATM transfer fee], [Citi Bank0234], and [******8435]; ii) remove repeating special characters, masked numbers, any trailing digits, and any accent words; and iii) resultant cleaned n-grams are [ATM transfer fee] and [Citi Bank]. The masked account number n-gram is removed.

At 508, the NLP 404 may extract specific phrases and entities from the cleaned transaction details (i.e., keywords). The extraction process may include extracting operational phrases, email addresses, phone numbers, names of payment processors, financial institutions (FI), and platforms involved in the transactions. As discussed above, the NLP 404 may receive token mappings from the one or more lookup tables stored on the database 410, such as the lookup tables 412, 414, 416, and 418. In an example embodiment, the NLP 404 may deterministically match the token mappings provided by the lookup tables to one or more of the n-grams (keywords) parsed from or identified in the raw transaction data 420 for the financial transaction. For example, the deterministic lookups performed by the NLP 404 may utilize search algorithm(s) implementing names, partial names, and/or identifiers such as phone numbers or address information. The algorithm(s) may search forward and in reverse and utilize other search techniques to identify strings that are matches or near matches to strings represented in existing token mapping(s). The NLP 404 may, for example, have json formatting and may include keywords, aliases, full names for entities, algorithms for searches for substrings, multiple keywords located anywhere in unstructured text data (e.g., not just in a string of certain length), and/or may perform filtering operations. In one or more embodiments, a combination of keywords found in the text data combined with satisfaction of certain accompanying rules may generate a positively matched entity (e.g., where certain strings are not found, one or more defined keywords may suffice, etc.).

In an example, using the n-grams extracted from the description and memo field of an example transaction record that state, "ATM transfer fee charged by Citi Bank," the NLP 404 may extract the following specific entities, based on the lookup table token mappings.

| |
|---|
| Operational Phrase: ATM transfer fee |
| Emails: None present |
| Phone Numbers: None present |
| Payment Processors: None present |
| Financial Institutions: Citi Bank |
| Platforms: None present |

At 510, the NLP 404 may perform a pattern recognition process on the transaction record's extracted n-grams (keywords). For example, patterns related to various financial institutions are identified within the transaction details. This step involves recognizing and categorizing specific patterns that are indicative of certain financial institutions. The pattern recognition process may include one or more rules and/or supervised machine-learning methodologies.

At 512, the NLP 404 may identify and extract geographical information such as a city, state, and/or other location data mentioned in the transaction details. For example, in one or more embodiments, the n-grams may be compared to a location dataset to identify such geographical information.

Continuing with the example above, from the identified n-grams, the NLP 404 may identify and extract the relevant phrases, entities, and other data as follows:

| |
|---|
| Original Transaction Detail: ATM transfer fee charged by Citi Bank |
| Operational Phrase: ATM transfer fee |
| Financial Institution: Citi Bank |
| Standardized Entity Name: City Bank |
| Transaction Category: ATM Fee (identified based on operational phrase that describes nature of the transaction) |

The NLP process facilitates in parsing and extracting meaningful information from the transaction details of each transaction record, thereby facilitating better understanding and categorization of the financial data. Furthermore, the unique NLP process performed by the NLP 404 is a one pass parser, performing its parsing, identifying, and extracting processes in a single pass through the raw transaction data 420. This results in increased efficiency of the server 10 by eliminating multiple passes through the raw transaction data 420.

At 514, the extracted relevant phrases, entities, and other data may be passed to the transaction labeler 406 for subsequent labeling and storing. Labelling of the transaction records is discussed above with reference to FIG. 4 and the transaction labeler 406.

Figure 6:
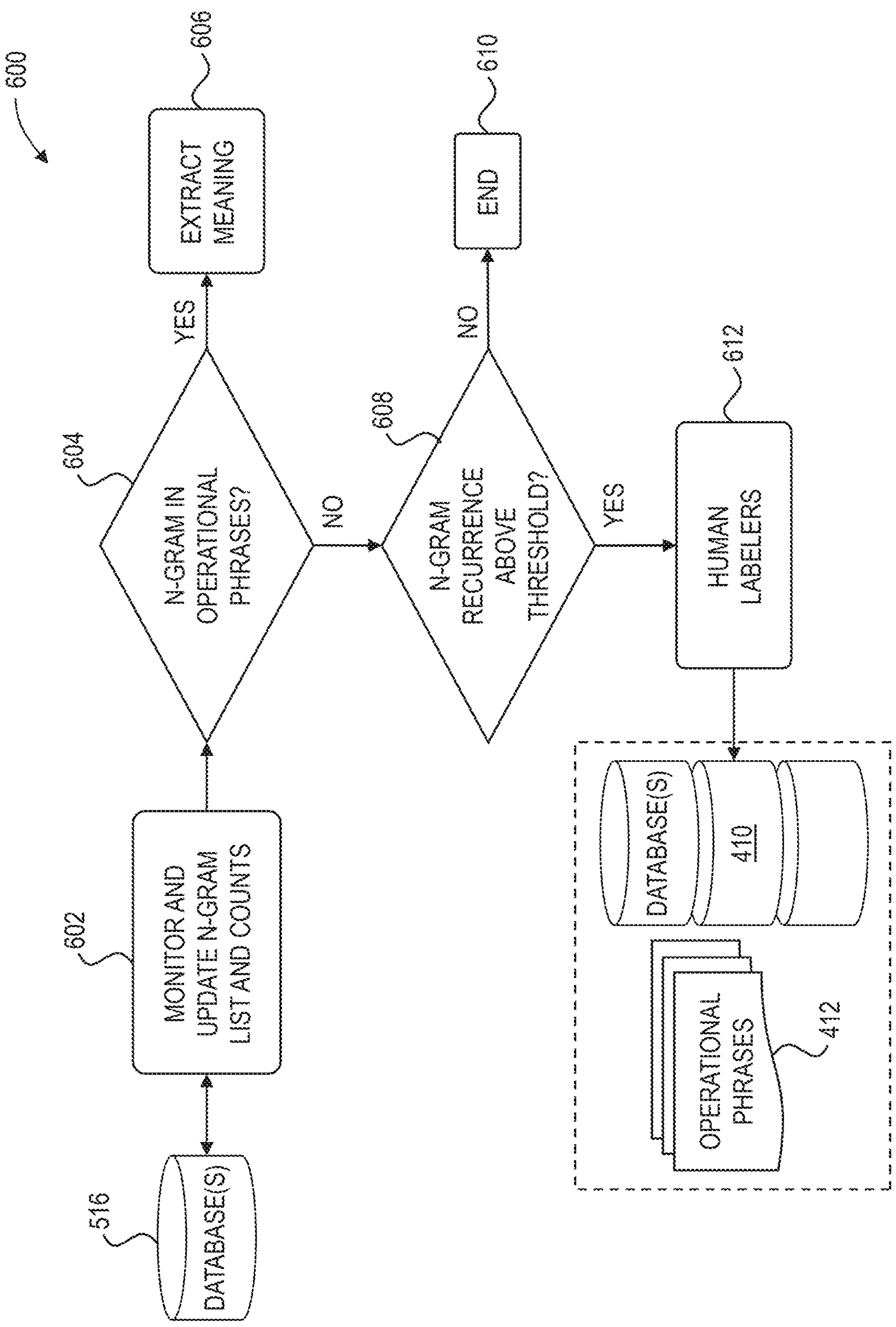
FIG. 6 is a flowchart of a process for identification and integration of new operational phrases using the framework of FIG. 4.

FIG. 6 is a flowchart of a process 600 for identification and integration of new operational phrases, in accordance with an aspect of the present disclosure. The process 600 may be interdependent with the processes described above in FIGS. 4 and 5. The interdependency illustrates a robust solution where new operational phrases may be continually identified, validated, and integrated, while existing operational phrases are used to accurately process the raw transaction data 420.

As described above, the NLP 404 may store the extracted n-grams in the database 516. At 602, the server 10 may continuously monitor and update the list of n-grams extracted from the transaction records of the raw transaction data 420. More specifically, the server 10 may monitor each n-gram stored in the database 516 by the NLP 404 (shown in FIG. 4) and store a count or tally of the number of times the n-gram is identified in the transactions records. In an example, the NLP 404 may identify, extract, and store the n-gram [ATM transfer fee] for a plurality of transaction records, such as ten (10) transaction records. The server 10 may record the count or tally (i.e., ten (10)) instances of the n-gram in the database 516 in association with the respective n-gram.

The server 10 may check to see if the n-gram is found in the operational phrases lookup table 412. This process may be performed by the NLP 404. Specifically, at 508 (shown in FIG. 5), the NLP 404 may deterministically match the token mappings provided by the lookup tables to one or more of the n-grams parsed from or identified in the raw transaction data 420 for the transaction record. If the n-gram is already in the operational phrases database, the process may continue at 606, where the meaning of the phrase is extracted and associated with the transaction record.

If the n-gram is not found in the operational phrases lookup table 412, at 608, the server 10 may check the stored count or tally of the number of instances the n-gram has been identified in the transaction records to determine if the count (i.e., the n-gram recurrence) is equal to or above a threshold value. If the count is below the threshold value, at 610, the n-gram may be dismissed and the process 600 may end for that particular n-gram.

If the count or number of occurrences of the n-gram in the raw transaction data 420 meets or exceeds the threshold, the n-gram may be flagged and submitted with a labeling request to human labelers 612. The human labelers 612 may analyze the n-gram, research the meaning of the n-gram, define the business logic associated with it, and update the operational phrases lookup table 412, stored in the database 410, with the new information. In an example, if "bank service fee" appears often enough in the transaction records but not in the operational phrases lookup table 412, it meets the threshold. The human labelers 615 research "bank service fee," determine its business logic, and add it to the lookup table 412.

Advantages of the processes described herein include enhanced data interpretation and accuracy, efficient transaction categorization, improved fraud detection and compliance, and operational efficiency. For example, operational phrases help in accurately interpreting transaction details. Financial transactions often include cryptic or shorthand descriptions that can be challenging to decipher without a standardized reference. By maintaining a comprehensive database of operational phrases, financial institutions can consistently understand the context and details of transactions. Further, operational phrases allow for the efficient categorization of transactions. For example, phrases like "ATM transfer fee charged" or "bank service fee" enable open banking systems to quickly identify and classify these transactions under specific categories such as service fees or ATM-related charges. This categorization is essential for financial reporting, budgeting, and analysis. Additionally, accurate identification and categorization of operational phrases enhance fraud detection and compliance efforts by recognizing unusual or unauthorized transaction patterns through specific phrases. Financial institutions can promptly flag such suspicious activities. This facilitates mitigating fraud and ensuring compliance with regulatory requirements. Furthermore, identifying, extracting, and categorizing operational phrases streamlines various back-office operations, reducing the manual effort required to process transaction data. This leads to cost savings and increases operational efficiency. By extracting and analyzing operational phrases, financial institutions can gain valuable insights into customer behavior and transaction trends. This data-driven approach may further support strategic decision-making, enabling the development of targeted financial products and services.

Additional Considerations

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

The detailed description is to be construed as exemplary only and does not describe every possible embodiment because describing every possible embodiment would be impractical. Numerous alternative embodiments may be implemented, using either current technology or technology developed after the filing date of this application, which would still fall within the scope of the invention.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the term “database” includes either a body of data, a relational database management system (RDBMS), or both. As used herein, a database includes, for example, and without limitation, a collection of data including hierarchical databases, relational databases, flat file databases, object-relational databases, object-oriented databases, and any other structured collection of records or data that is stored in a computer system. Examples of RDBMS’s include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term “processor” or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor includes a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

What is claimed is:

1. A computing system comprising:

a database including:

an operational phrases lookup table including one or more records, each record including an operational phrase and an associated description, definition, and/or related details, and raw transaction data, the raw transaction data including individual transaction data pieces, each of the transaction data pieces including multiple data fields, the multiple data fields including a description data field and a memo data field, each data field including text;

one or more processors; and a memory storing computer-executable instructions thereon, that when executed by the one or more processors, cause the one or more processors to perform operations comprising:

receiving the raw transaction data from the database, performing a natural language processing operation on the raw transaction data, including identifying one or more keywords within one or more of the description and memo data fields for each transaction data piece, matching the one or more keywords to one or more operational phrases included in the operational phrases lookup table, and creating labeled transaction data by associating one or more labels with each transaction data piece, the one or more labels corresponding to the matched one or more operational phrases based on the matching.

2. The computing system in accordance with claim 1, the identifying one or more keywords operation including tokenizing the text of the description and memo data fields.

3. The computing system in accordance with claim 2, further comprising:

employing n-gram analysis of the tokenized text of the description and memo data fields.

4. The computing system in accordance with claim 3, the n-gram analysis including sequentially grouping the tokenized text into n-word clusters, where the n is an integer value.

5. The computing system in accordance with claim 1, the receiving the raw transaction data comprising one or more of the following: retrieving the raw transaction data from the database and receiving the raw transaction data from one or more data source computing devices.

6. The computing system in accordance with claim 1, further comprising:

performing a pattern recognition process on the one or more keywords.

7. The computing system in accordance with claim 1, further comprising:

outputting the labeled transaction data to an output module;

generating, by the output module, output data, wherein the output data includes each associated transaction data piece and the matched one or more operational phrases; and storing, by the output module, the output data in the database.

8. A computer-implemented method performed by a server, the method comprising:

receiving raw transaction data from a database, the database including the raw transaction data and an operational phrases lookup table, the operational phrase lookup table including one or more records, each record including an operational phrase and an associated description, definition, and/or related details, the raw transaction data including individual transaction data pieces, each of the transaction data pieces including multiple data fields, the multiple data fields including a description data field and a memo data field, each data field including text;

performing a natural language processing operation on the raw transaction data, including identifying one or more keywords within one or more of the description and memo data fields for each transaction data piece;

matching the one or more keywords to one or more operational phrases included in the operational phrases lookup table; and creating labeled transaction data by associating one or more labels with each transaction data piece, the one or more labels corresponding to the matched one or more operational phrases based on the matching.

9. The method in accordance with claim 8, the identifying one or more keywords operation including tokenizing the text of the description and memo data fields.

10. The method in accordance with claim 9, further comprising:

employing n-gram analysis of the tokenized text of the description and memo data fields.

11. The method in accordance with claim 10, the n-gram analysis including sequentially grouping the tokenized text into n-word clusters, where the n is an integer value.

12. The method in accordance with claim 8, the receiving the raw transaction data comprising one or more of the following: retrieving the raw transaction data from the database and receiving the raw transaction data from one or more data source computing devices.

13. The method in accordance with claim 8, further comprising:

performing a pattern recognition process on the one or more keywords.

14. The method in accordance with claim 8, further comprising:

outputting the labeled transaction data to an output module;

generating, by the output module, output data, wherein the output data includes each associated transaction data piece and the matched one or more operational phrases; and storing, by the output module, the output data in the database.

15. A non-transitory computer-readable storage media having computer-executable instructions stored thereon, wherein when executed by one or more processors, the computer-executable instructions cause the one or more processors to:

receive raw transaction data from a database, the database including the raw transaction data and an operational phrases lookup table, the operational phrase lookup table including one or more records, each record including an operational phrase and an associated description, definition, and/or related details, the raw transaction data including individual transaction data pieces, each of the transaction data pieces including multiple data fields, the multiple data fields including a description data field and a memo data field, each data field including text;

perform a natural language processing operation on the raw transaction data, including identifying one or more keywords within one or more of the description and memo data fields for each transaction data piece;

match the one or more keywords to one or more operational phrases included in the operational phrases lookup table; and create labeled transaction data by associating one or more labels with each transaction data piece, the one or more labels corresponding to the matched one or more operational phrases based on the matching.

16. The non-transitory computer-readable storage media of claim 15, the identifying one or more keywords operation including tokenizing the text of the description and memo data fields.

17. The non-transitory computer-readable storage media of claim 16, wherein when executed by the one or more processors, the computer-executable instructions further cause the one or more processors to:

employ n-gram analysis of the tokenized text of the description and memo data fields.

18. The non-transitory computer-readable storage media of claim 17, the n-gram analysis including sequentially grouping the tokenized text into n-word clusters, where the n is an integer value.

19. The non-transitory computer-readable storage media of claim 15, wherein when executed by the one or more processors, the computer-executable instructions further cause the one or more processors to:

perform a pattern recognition process on the one or more keywords.

20. The non-transitory computer-readable storage media of claim 15, wherein when executed by the one or more processors, the computer-executable instructions further cause the one or more processors to:

output the labeled transaction data to an output module;

generate, by the output module, output data, wherein the output data includes each associated transaction data piece and the matched one or more operational phrases; and store, by the output module, the output data in the database.

* * * * *